L. BANGERT.
AGRICULTURAL MACHINE.
APPLICATION FILED JAN. 17, 1914.

1,176,020.

Patented Mar. 21, 1916.
2 SHEETS—SHEET 1.

Louis Bangert,
Inventor

Witnesses by _____ Attorneys

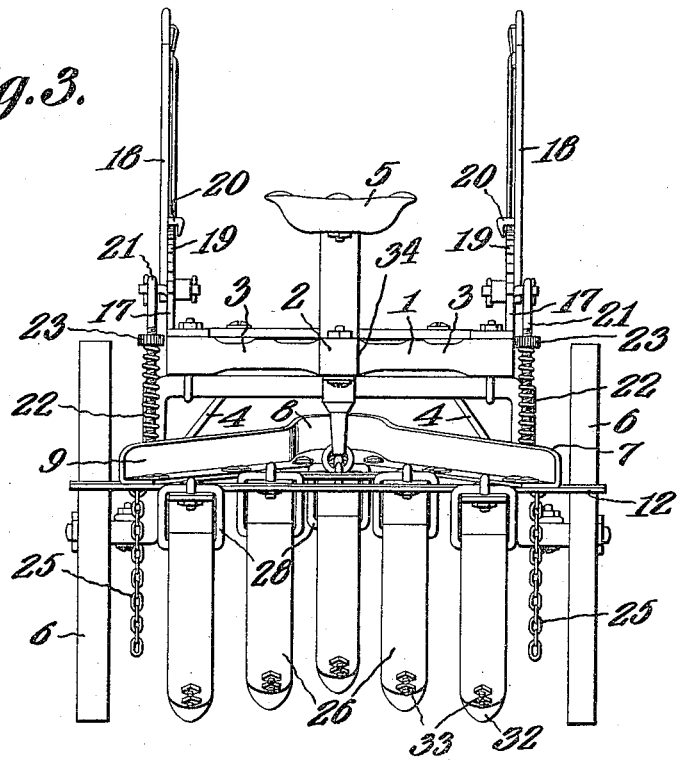

UNITED STATES PATENT OFFICE.

LOUIS BANGERT, OF SALEM, MISSOURI.

AGRICULTURAL MACHINE.

1,176,020.  Specification of Letters Patent.  Patented Mar. 21, 1916.

Application filed January 17, 1914. Serial No. 812,781.

*To all whom it may concern:*

Be it known that I, LOUIS BANGERT, a citizen of the United States, residing at Salem, in the county of Dent and State of Missouri, have invented a new and useful Agricultural Machine, of which the following is a specification.

The present invention appertains to an agricultural machine, and aims to provide a novel and improved contrivance of that character, which may be employed as a plow, cultivator, harrow and marker.

It is the object of the present invention to provide an agricultural machine of the nature indicated, of the riding or wheel mounted type, including a floating frame for carrying the earth tilling or engaging elements, and means for connecting the draft animals to the said frame whereby the tongue will be relieved, to a great extent, of the downward strain thereon, in the use of the machine.

Another object of the present invention is to provide a device of the character specified, embodying an arched axle for the ground wheels, and having the tongue attached thereto, in connection with a floating frame for the earth tilling or engaging elements disposed underneath the said axle and connected loosely to the tongue, for the attachment of the draft animals, and lifting or adjusting mechanisms carried by the axle and connected to the said floating frame for controlling the vertical position thereof.

With the foregoing and other objects in view, which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention has been illustrated in its preferred embodiment in the accompanying drawings, wherein—

Figure 1:
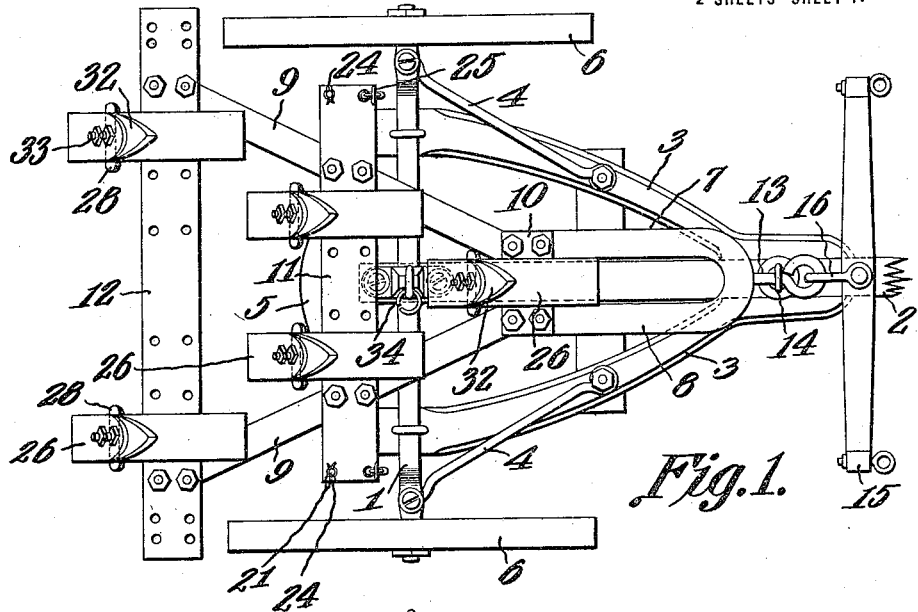
Figure 2:
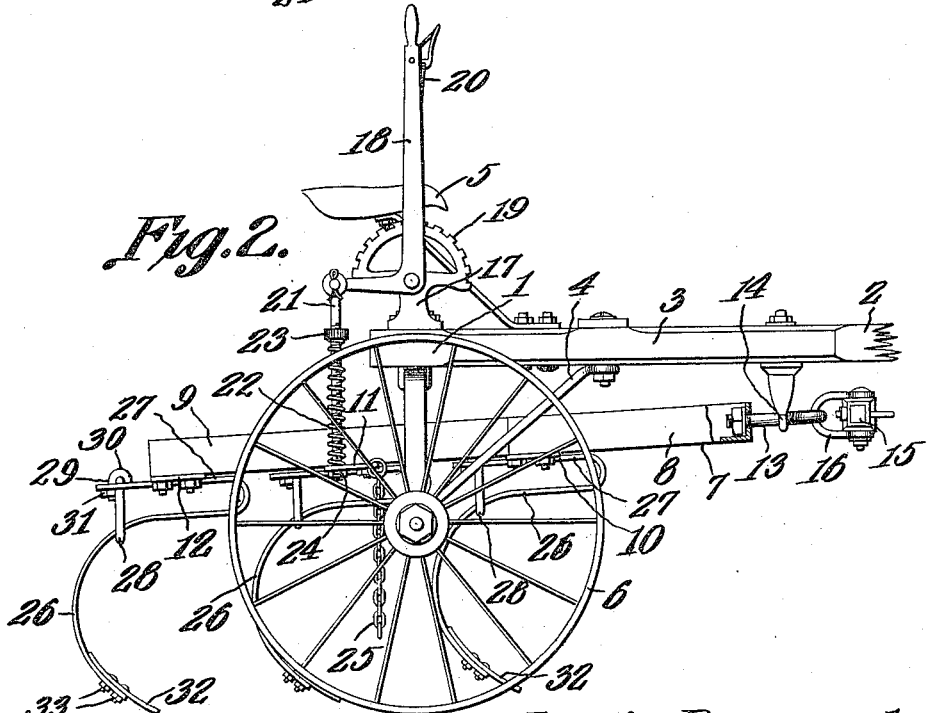

Figure 1 is a bottom view of the machine, a portion of the tongue being broken away. Fig. 2 is a side elevation of the machine, a portion of the tongue being broken away. Fig. 3 is a rear view.

In carrying out the present invention, the riding frame includes an arched axle 1, and a tongue 2 having its rear or butt end secured upon the central or crest portion of the axle 1, hounds 3 connecting the tongue 2 in advance of the axle, and the upper portion of the axle at the sides of the rear or butt end of the tongue, while braces or stay rods 4 connect the hounds 3 and the basal portions of the spindle of the axle 1 to steady the axle relative to the tongue and hounds. The operator's seat 5 is mounted upon the tongue 2, and is preferably adjustable along the rear end portion of the tongue, whereby the weight of the operator may be properly adjusted to balance or overbalance the machine. The ground wheels 6, which may be of various diameters, are journaled upon the spindles of the axle 1.

The floating frame, designated generally by the numeral 7, is disposed below the arched axle 1 and the rear end portion of the tongue 2, and includes an angle iron member doubled and bent to provide the U-shaped portion 8 and the diverging portions 9 extending from the ends of the U-shaped portion 8, the portion 8 being disposed foremost and below the rear end portion of the tongue, and the diverging portions or arms 9 projecting rearwardly below and beyond the axle. One flange of the angle iron member is disposed at the bottom, while the other or vertical flange projects upwardly. The floating frame also includes a cross bar or strip 10 bolted, riveted or otherwise secured to the lower flange of the angle iron member at the juncture of the portions 8 and 9, a cross bar or strip 11 bolted, riveted or otherwise secured to the bottom of the diverging portions 9, intermediate their ends, and a cross bar or strip 12, bolted, riveted or otherwise secured to the bottom of the diverging portions 9 at their free or rear ends. The bars 10, 11 and 12 are of lengths proportional to the forward, intermediate and rear spaces between the diverging portions 9, the ends of the intermediate and rear bars 11 and 12 preferably projecting or extending beyond the diverging portions 9. The cross bars 10, 11 and 12 are provided with suitable apertures throughout their lengths for the passage of bolts or other securing members to attach the earth tilling or engaging elements to the same.

In order to attach the draft animals to the floating frame 7, an eye bolt providing a draft member 13 has the rear end of its shank swiveled through the forward end or bend of the angle iron member, or the bend of the U-shaped portion 8, and the shank of the said draft member is slidable through an eye provided at the free or lower end of a depending or pendant guide arm 14 rigidly carried by the tongue 2. The double tree 15, which is arranged for the attachment of the usual swingle trees, is connected, by means of a clevis 16, to the eye at the forward end of the draft member 13, whereby when the draft animals are hitched or attached to the double tree 15, the draft will be transmitted directly to the floating frame 7, instead of to the heel or rear end portion of the tongue 2, as usual.

The double tree which is connected loosely to the forward end of the draft member 13 projects to the opposite sides of the tongue, whereby the draft animals at the opposite sides of the tongue may be readily hitched to the arms of the double tree.

The lifting or adjusting means for the floating frame includes a pair of brackets 17 secured upon the rear ends of the hounds 3, or upon the axle 1, and angular or bell crank hand levers 18 pivoted or fulcrumed to the brackets 17, the brackets 17 being provided with segments 19 for the engagement of locking means 20 carried by the hand levers 18, in order that the hand levers may be locked at various adjusted positions, in the usual manner. Lift rods or hangers 21 have their upper ends pivotally or loosely connected to the lower or short arms of the hand levers 17, and have their lower ends slidable through suitable apertures in the end portions of the intermediate bar 11 of the floating frame, coiled wire compression springs 22 being mounted upon the rods 21 and having their lower ends seating upon the cross bar 11, while their upper ends engage collars 23 mounted upon the rods 21. Suitable stops 24 are engaged to the lower ends of the rods 21, upon which the cross bar 11 is adapted to rest or seat, for supporting the floating frame from the rods 21, the springs 22 permitting the floating frame to yield upwardly.

The lift rods or hangers 21 serve to loosely support the opposite sides of the floating frame from the axle, whereby the floating frame may tilt laterally and have a slight lateral vibration, as well as a swinging movement about a longitudinal axis.

Instead of employing the lift rods 21, lift chains or hangers 25 connected to the ends of the cross bar 11 may have their free ends connected to the lower or short arms of the hand levers 18, for permitting the floating frame to be supported by the hand levers, the chains permitting the floating frame to move or yield upwardly readily, without pressing the floating frame downwardly, the floating frame merely moving downwardly by reason of its weight, or by the action of gravity.

Each of the soil tilling or engaging elements embodies a resilient curved or arcuate tooth 26 bent from a bar or strip of suitable metal, and having its upper end portion bolted or otherwise fastened to the floating frame.

Blades or shovels 32 are preferably bolted or fastened upon the lower end portions of the teeth 26, by means of bolts 33, the blades or shovels 32 having both ends sharpened or formed to engage the soil, whereby the blades may be reversed.

As illustrated in the drawings, one tooth is attached to the forward cross bar 10 of the floating frame, and a pair of the teeth are attached to each of the cross bars 11 and 12, whereby the teeth will be in a V-shaped arrangement, although it is to be understood that the teeth may be attached to the cross bars in various manners, according to the use to which the machine is to be put.

A depending arm 34 is secured to the central portion of the axle 1, and to the heel or rear end of the tongue 2, for the attachment of various implements when the floating frame is moved, or for supporting the floating frame, when desired.

In use, when the draft animals are hitched to the double tree 15, the draft will be transmitted directly to the floating frame 7, which carries the earth tilling or engaging elements, so as to relieve the tongue 2 of the draft, to a great extent. Thus, the tendency for the tongue to be pulled or drawn downwardly, to the discomfort of the draft animals, is avoided to a large extent, it being observed that the floating frame is connected flexibly to the lifting mechanisms or devices carried by the arched axle. The structure of the machine, as a whole, is comparatively simple, substantial and inexpensive, as well as being convenient, practical and efficient in use.

The present machine may be employed for plowing new ground, or may be employed for cultivating, or harrowing the soil, as well as marking or laying off the soil. In either case, should the teeth 26 engage rocks or other non-yieldable obstructions, the teeth will yield or spring to disengage the same. The present teeth when constructed of comparatively rigid stock or bars, will effectively tear up small rocks and sprouts or other objects from the soil. The teeth may also be employed for pulverizing or stirring the soil for cultivating grain, and vegetables, or for harrowing the soil. The sizes of the teeth may vary, according to the uses to which the machine is to be put. It will be evident that by employing a suitable number of teeth, the machine may be employed in the usual manner, for marking off corn land, or the like, for facilitating the dropping or planting of the seed.

The floating frame may be readily adjusted by manipulating the hand levers 18, as will be obvious, the lift rods 21 supporting the floating frame, and the springs 22 permitting the floating frame to yield, as a whole, upwardly. If the lift chains 25 are employed in place of the lift rods 21, the floating frame will drag upon the soil, which is desirable in harrowing, the lift rods 21 being employed when the machine is employed for plowing or cultivating.

Particular attention is directed to the fact that the axis of the draft member 13 and the longitudinal median line of the floating frame are in alinement, and that the arms or portions 9 of the floating frame diverge rearwardly, whereby the draft will be transmitted from the draft member 13 along divergent lines to the earth tilling elements. Thus, the floating frame when being drawn over the ground, will tend to maintain a normal straight line position, although it is to be noted that the floating frame may swing laterally and vertically. Another salient feature of the invention resides in the fact that the sides of the floating frame are loosely supported by the hangers, whereby the floating frame may sway or swing sidewise or laterally, as well as yield or swing vertically, and furthermore, the floating frame may swing about its longitudinal median line or the axis of the draft member 13. The floating frame may therefore accommodate itself to the irregularities of the surface of the soil in a most efficient and practical manner.

Having thus described the invention, what is claimed as new is:

In an agricultural machine, a sulky frame having a tongue and ground wheels, a floating frame disposed below the axle and embodying a doubled member having its bend disposed foremost and its arms diverging rearwardly, a draft member slidable through said bend and having its rear end swiveled to the bend of said doubled member, a doubletree connected to the forward end of the draft member and projecting to the opposite sides of said tongue, and means carried by the sulky frame for yieldably suspending the opposite side portions of said floating frame.

In testimony that I claim the foregoing as my own, I have hereto affixed my signature in the presence of two witnesses.

LOUIS BANGERT.

Witnesses:
 H. A. BENNETT,
 L. C. WARE.

Copies of this patent may be obtained for five cents each, by addressing the "Commissioner of Patents, Washington, D. C."